US007058405B2

(12) United States Patent
Chandra et al.

(10) Patent No.: US 7,058,405 B2
(45) Date of Patent: *Jun. 6, 2006

(54) USER EQUIPMENT (UE) ASSISTED SYSTEM DATABASE UPDATE

(75) Inventors: Arty Chandra, Manhasset Hills, NY (US); Prabhakar R. Chitrapu, Blue Bell, PA (US); Narayan Parappil Menon, Old Bethpage, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/822,502

(22) Filed: Apr. 12, 2004

(65) Prior Publication Data
US 2004/0192327 A1    Sep. 30, 2004

Related U.S. Application Data

(63) Continuation of application No. 10/328,623, filed on Dec. 23, 2002, now Pat. No. 6,735,443.

(60) Provisional application No. 60/392,211, filed on Jun. 28, 2002.

(51) Int. Cl.
H04Q 7/20    (2006.01)

(52) U.S. Cl. ............... 455/436; 455/446; 455/422.1

(58) Field of Classification Search .......... 455/436, 455/437, 442, 443, 439, 422.1, 446, 432.3, 455/432.1, 435.1, 435.2, 438; 370/328, 331, 370/335, 332
See application file for complete search history.

(56) References Cited

U.S. PATENT DOCUMENTS

| | | | |
|---|---|---|---|
| 5,883,598 A | 3/1999 | Parl et al. | |
| 5,915,221 A | 6/1999 | Sawyer et al. | |
| 5,918,181 A | 6/1999 | Foster | |
| 5,918,183 A | 6/1999 | Janky et al. | |
| 6,167,274 A | 12/2000 | Smith | |
| 6,195,342 B1 | 2/2001 | Rohani | |
| 6,400,952 B1 | 6/2002 | Kim et al. | |
| 6,430,414 B1 | 8/2002 | Sorokine et al. | |
| 6,434,387 B1 | 8/2002 | Lee | |
| 6,456,843 B1 | 9/2002 | Daly | |
| 6,493,550 B1 | 12/2002 | Raith | |
| 6,522,888 B1 | 2/2003 | Garceran et al. | |
| 6,546,052 B1 | 4/2003 | Maeda et al. | |
| 6,564,052 B1 | 5/2003 | Kawano et al. | |
| 6,591,102 B1 | 7/2003 | Chavez et al. | |
| 6,735,443 B1 * | 5/2004 | Chandra et al. | 455/436 |
| 2002/0147008 A1 * | 10/2002 | Kallio | 455/426 |
| 2003/0125046 A1 * | 7/2003 | Riley et al. | 455/456 |
| 2003/0134638 A1 * | 7/2003 | Sundar et al. | 455/435 |
| 2003/0142641 A1 * | 7/2003 | Sumner et al. | 370/328 |

FOREIGN PATENT DOCUMENTS

| EP | 1 081 972 | 3/2001 |
|---|---|---|
| EP | 1 215 928 | 6/2002 |

* cited by examiner

Primary Examiner—Jean Gelin
(74) Attorney, Agent, or Firm—Volpe and Koenig, P.C.

(57) ABSTRACT

A user equipment (UE) operating in a wireless system having at least one base station, communicates with base stations in neighboring wireless systems and conveys information regarding these neighboring wireless systems to the base station of its wireless system, which updates and stores this information for use in handover of UEs. The BS may also obtain updates directly from the base stations of neighboring wireless systems which may include a diversity of systems such as WLANS, Bluetooth, UMTS, GPRS, etc., and provide to UEs a list of those wireless systems which the UEs need not provide updates to the BS providing the list.

12 Claims, 2 Drawing Sheets

USER EQUIPMENT (UE) ASSISTED SYSTEM DATABASE UPDATE

CROSS REFERENCE TO RELATED APPLICATIONS

This application is a continuation of U.S. patent application Ser. No. 10/328,623, filed Dec. 23, 2002 now U.S. Pat. No. 6,735,443, which claims the benefit of U.S. provisional application No. 60/392,211 filed on Jun. 28, 2002, which is incorporated by reference as if fully set forth.

FIELD OF THE INVENTION

The present invention relates to wireless communication systems. In particular, the invention relates to database processing of information for user equipment (UE) handover.

BACKGROUND

User equipment (UE) in wireless communication systems are beginning to provide functionality for internet/public service telephone network (PSTN) access via multiple wireless systems (such as (WLANs), Bluetooth® a registered trademark for a wireless network, universal mobile telecommunications system (UMTS), general packet radio service (GPRS), etc.). Hence, there is a growing need for these systems to work with each other in order for a UE to handover from one technology to another.

To assist in a handover, a wireless communication system base station can relay to a UE the information pertaining to outside systems. Thus, a base station needs to retain and constantly update information about the other systems. Retrieval of the information about another system is possible through secure inter-system connections (such as via an IP-cloud, for example) under roaming agreements. However, it is a deployment challenge to maintain and update such information about other systems. Hence there is a need for an alternate source to assist the base station in supplying the outside system information in order to eliminate the need for explicit inter-system connections and communications for this purpose.

SUMMARY

The present invention employs a technique for obtaining and updating data relating to neighboring wireless systems.

DETAILED DESCRIPTION OF THE PREFERRED EMBODIMENTS

Figure 1:
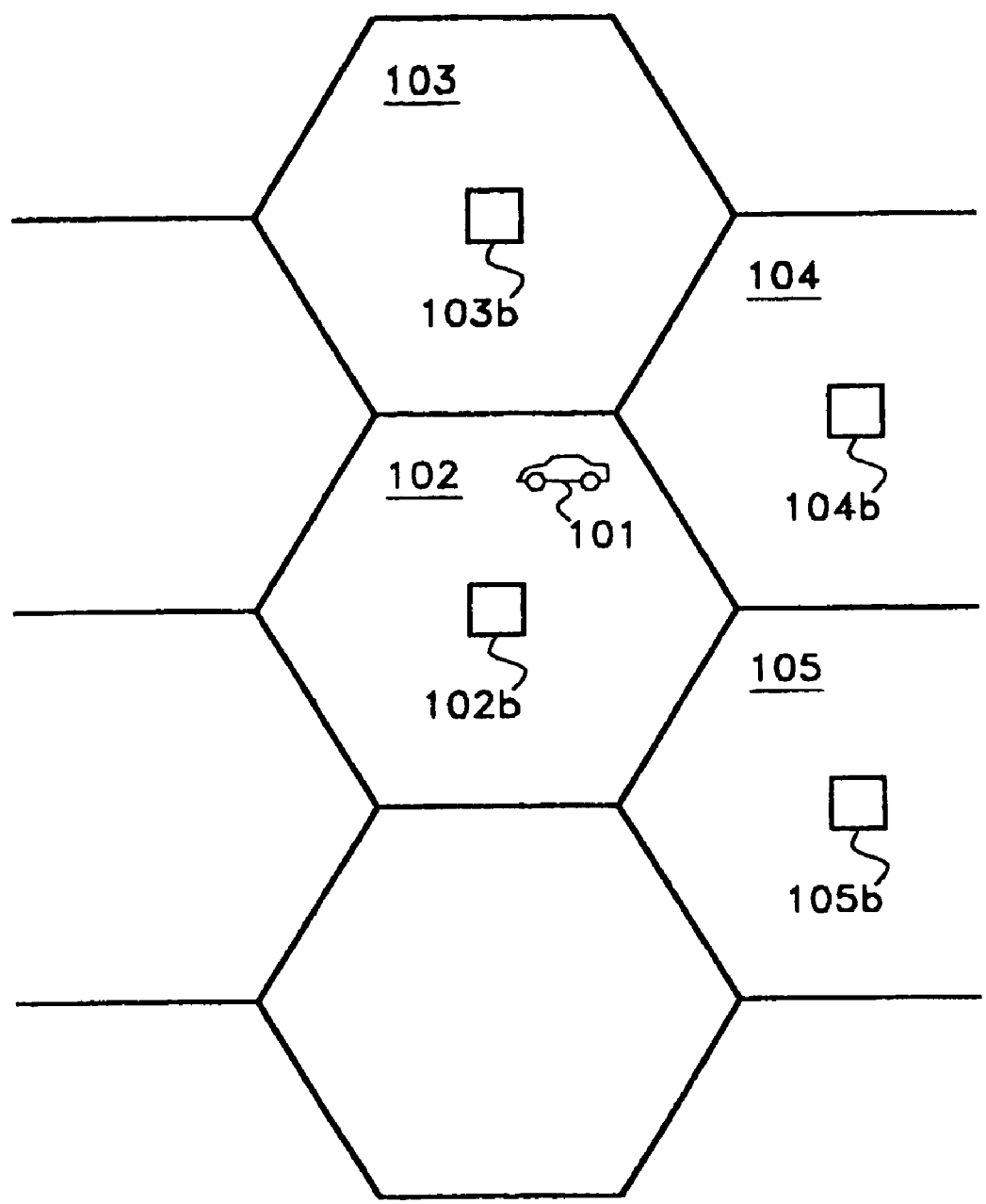
FIG. 1 is a simplified diagram showing a plurality of wireless systems and user equipments within the wireless systems, which may employ the technique and principles of the present invention to great advantage.

FIG. 1 shows a multimode UE 101 operating within a wireless system 102 having an associated base station (BS) 102b, while also being able to detect multiple surrounding wireless systems 103–105. Upon detection of information from wireless systems 103–105, UE 101 sends the current information to BS 102b of system or systems 103–105. BS 102b can then update its database based on this new information from UE 101. Likewise, subsequent handovers of UE 101 to other base stations can provide base station database updates. For example, after handover to wireless system 103, UE 101 sends information pertaining to the most recently resident system (i.e., system 102), to base station(BS) 103b, which then updates its database accordingly.

Figure 2:
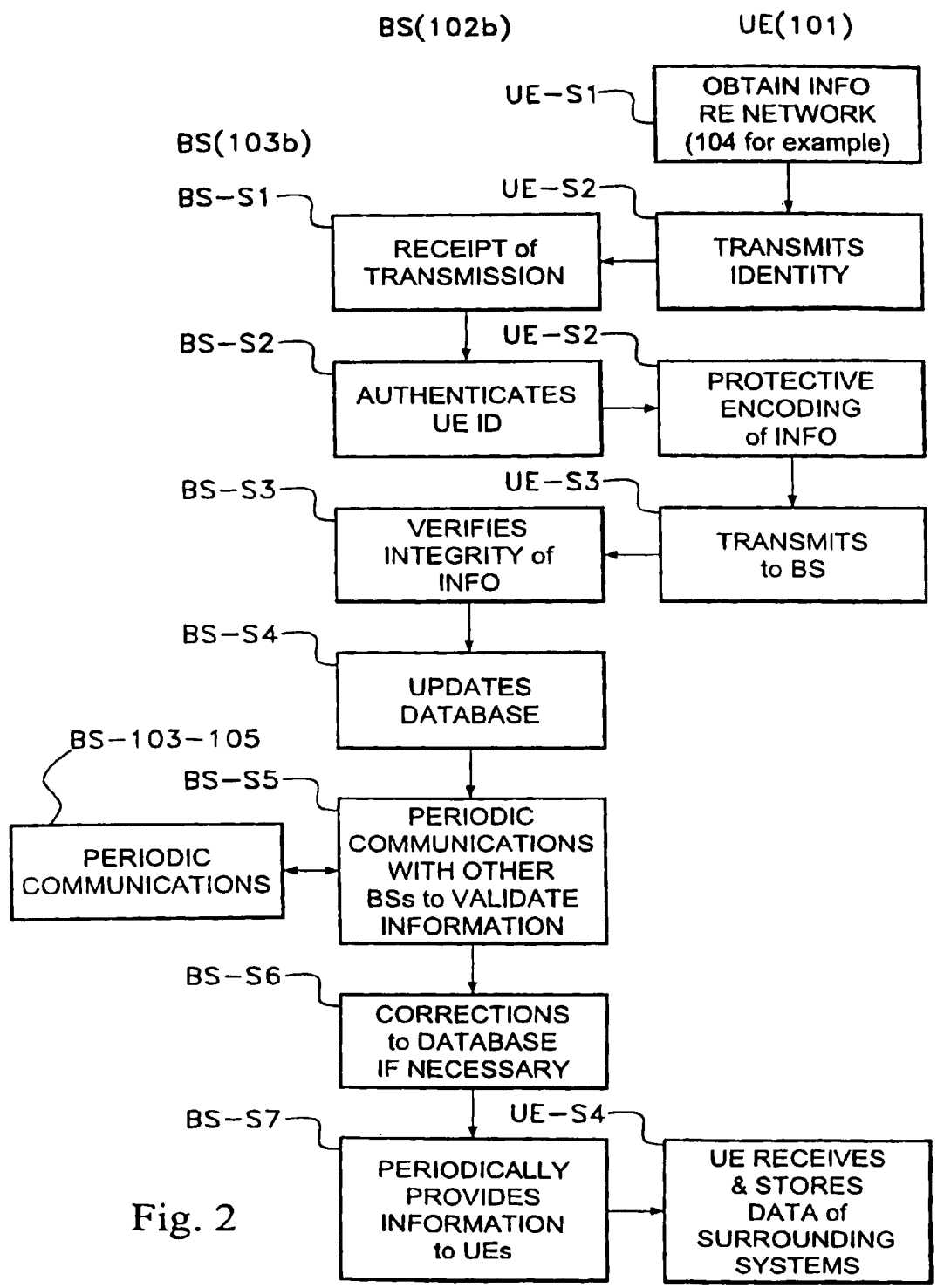
FIG. 2 is a flow diagram useful in explaining the principles of the present invention and a method to implement such a system.

FIG. 2 shows a process flow diagram for the exchange of information between BS 102b and UE 101. Although this process is shown with a single UE for simplicity in explanation, multiple UEs may interact with BS 102b at the same time. System information that is sent from a UE to the BS and vice versa may include, but is not limited to: geo-location of a UE, new system, congestion at the network and failure to detect a network.

At UE-S1, UE 101 obtains information relating to network 104, for example. At step UE-S2, UE 101 transmits its identity to BS 102b. At step BS-S1, BS 102b receives the identify of UE 101. At BS-S2 BS 102 first authenticates the identity of UE 101. This ensures that BS 102b will not accept information about other systems from malicious UEs. Next, at step UE-S2, responsive to the authentication, the information is protectively encoded for integrity by UE 101 and, at step UE-S3, the protected information is transmitted by UE 101 to BS 102b. A preferred method of protective encoding is via message authentication codes. Encryption may also be used to protect the information from being eavesdropped. At step BS-S3, BS 102b verifies the integrity of the information. At step BS-S4, BS 102b accepts the information and updates its databases. Now that BS 102b has updated its database, BS 102b, at step BS-S5, may communicate with adjacent systems 103–105 at regular intervals or triggered instants of time to validate the information updates received from UE 101. Corrections to the database, if needed are made at step BS-S6.

System efficiency can be gained by BS 102b taking a proactive role in letting UE 101 know of its surrounding systems, at step BS-S7. Hence, UE 101 need not send any information if its resident system is on the list provided by BS 102b. This reduces radio traffic due to multiple UEs sending similar information.

This database stored in each BS is used for cell re-planning and system layover during deployment of additional networks. For example, consider a UMTS system overlaid over disjointed WLANs. The information gathered at the UMTS base station is used for planning WLAN network in that area. System 102 gets geo-locations of different UEs as they communicate about other systems (say System 103). The operator can use the geo-location of each UE that reported about system 103 to approximate the coverage of system 103. This approximate coverage area can be used to plug coverage holes or future deployment planning of system 103.

What is claimed is:

1. In a wireless communication system comprising a plurality of wireless local area networks (WLANs), each WLAN having a plurality of resident user equipments (UEs) communicating with a base station (BS) residing within the WLAN, a method for updating a WLAN database maintained by each BS, the method comprising:
   each resident UE transmitting its geo-location information to the BS within the WLAN;
   communicating by at least one UE with neighboring base stations of neighboring WLANs;

updating the WLAN database at the BS to include the geo-location information of neighboring WLANs; and approximating coverage area of neighboring WLANs according to the geo-location information in the updated system database.

2. The method of claim 1, further comprising the BS verifying the integrity of the information transmitted by any UE.

3. The method of claim 1, where the neighboring WLAN provides coverage which does not overlap coverage of the resident WLAN.

4. The method of claim 1, further comprising:

the UE receiving traffic loading information from neighboring base stations; and updating the WLAN database at the BS to include traffic loading information of neighboring WLANs.

5. The method of claim 1 wherein the neighboring WLANs have different radio access technology.

6. The method of claim 5 further comprising the UE providing the BS with information including radio access technology of neighboring WLANs.

7. The method of claim 1, where said UE sends information which includes signal power levels of the neighboring WLANs.

8. The method of claim 1, where the UE sends the geo-location information responsive to being authenticated by the BS.

9. The method of claim 1, where the UE transmits the geo-location information together with a message authentication code.

10. The method of claim 1, where the UE encrypts information sent to the BS.

11. The method of claim 1, further comprising:

the base station alerting the UE as to neighboring WLANs known by the base station for reducing traffic due to multiple UEs sending similar information.

12. The method of claim 11 wherein the receiving UE limits reports on neighboring base stations to those base stations that are not included in the alert received from its associated base station.

* * * * *